United States Patent
Kämpf et al.

(10) Patent No.: US 11,760,122 B2
(45) Date of Patent: Sep. 19, 2023

(54) DEVICE FOR MANUAL APPLICATION OF A LIQUID

(71) Applicant: STABILO International GmbH, Heroldsberg (DE)

(72) Inventors: Karl-Peter Kämpf, Röttenbach (DE); Thiemo Daubner, Nuremberg (DE)

(73) Assignee: STABILO International GmbH

( * ) Notice: Subject to any disclaimer, the term of this patent is extended or adjusted under 35 U.S.C. 154(b) by 569 days.

(21) Appl. No.: 16/968,869

(22) PCT Filed: Feb. 5, 2019

(86) PCT No.: PCT/EP2019/052771
§ 371 (c)(1),
(2) Date: Aug. 10, 2020

(87) PCT Pub. No.: WO2019/158399
PCT Pub. Date: Aug. 22, 2019

(65) Prior Publication Data
US 2021/0046781 A1    Feb. 18, 2021

(30) Foreign Application Priority Data

Feb. 19, 2018   (DE) .............................. 202018000858

(51) Int. Cl.
*B43K 5/12*     (2006.01)
*A45D 34/04*    (2006.01)
(Continued)

(52) U.S. Cl.
CPC ................ *B43K 5/12* (2013.01); *A45D 34/04* (2013.01); *B43K 29/08* (2013.01); *G01F 23/243* (2013.01);
(Continued)

(58) Field of Classification Search
CPC ........ B43K 5/12; B43K 29/08; B43K 5/1809; B43K 1/003; B43K 1/006; A45D 34/04;
(Continued)

(56) References Cited

U.S. PATENT DOCUMENTS 3,475,103 A   10/1969   Danjczek
4,435,099 A   3/1984    Murahara
(Continued)

FOREIGN PATENT DOCUMENTS

CN   101890858 A    11/2010
CN   104287166 A    1/2015
(Continued)

OTHER PUBLICATIONS

European Patent Office, International Search Report for International Application No. PCT/EP2019/052771, dated Apr. 24, 2019.
(Continued)

*Primary Examiner* — David J Walczak
(74) *Attorney, Agent, or Firm* — Bradley Arant Boult Cummings

(57) ABSTRACT

A device for manual application of a liquid. The device may be used for painting, marking, drawing, writing and/or applying make-up to keratinous surfaces. The device includes a capillary store for the liquid, the capillary store having a filing level, and a measuring device for measuring the filing level of the capillary store.

20 Claims, 4 Drawing Sheets

Figure 1:
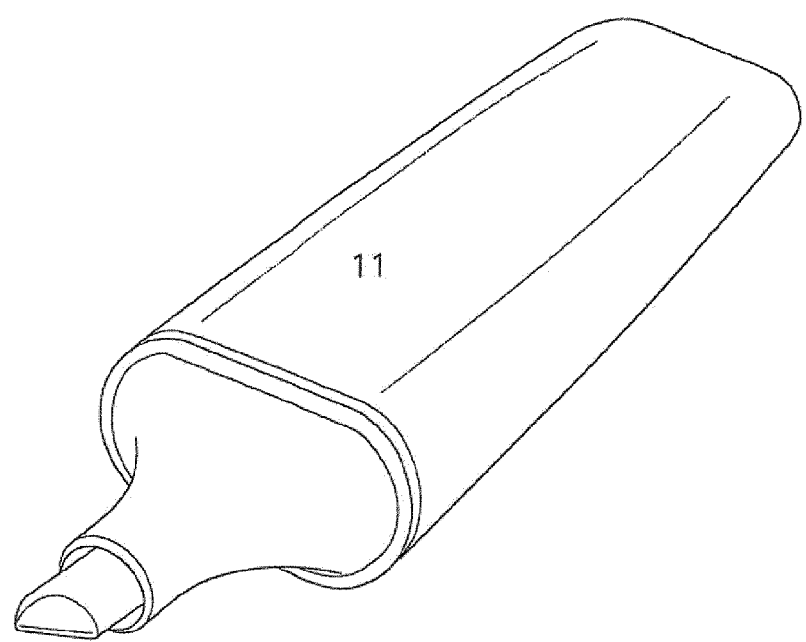

(51) Int. Cl.
*B43K 29/08* (2006.01)
*G01F 23/24* (2006.01)
*G01F 23/263* (2022.01)
*G01F 23/80* (2022.01)
*G01N 27/04* (2006.01)
*G01N 27/22* (2006.01)

(52) U.S. Cl.
CPC .......... *G01F 23/266* (2013.01); *G01F 23/804* (2022.01); *G01N 27/048* (2013.01); *G01N 27/223* (2013.01); *A45D 2200/052* (2013.01)

(58) Field of Classification Search
CPC ............ A45D 2200/052; G01F 23/243; G01F 23/266; G01F 23/804; G01N 17/048; G01N 27/223
USPC .................................. 401/198, 199, 192, 194
See application file for complete search history.

(56) References Cited

U.S. PATENT DOCUMENTS

| | | | |
|---|---|---|---|
| 4,573,819 A | | 3/1986 | Herrnring |
| 4,614,163 A | | 9/1986 | Hetzer |
| 5,211,495 A | | 5/1993 | Jozat et al. |
| 5,440,327 A | | 8/1995 | Stevens |
| 5,865,553 A | * | 2/1999 | Flye Sainte Marie ... B43K 5/12 401/199 |
| 6,250,832 B1 | | 6/2001 | Del Vecchio |
| 2005/0232685 A1 | * | 10/2005 | Koyama ................ C09D 11/16 401/198 |
| 2012/0207533 A1 | | 8/2012 | Liu |
| 2013/0167371 A1 | | 7/2013 | Dong et al. |
| 2014/0223720 A1 | | 8/2014 | Henry et al. |

FOREIGN PATENT DOCUMENTS

| | | |
|---|---|---|
| CN | 104442088 A | 3/2015 |
| CN | 204210194 U | 3/2015 |
| CN | 104553504 A | 4/2015 |
| CN | 204398591 U | 6/2015 |
| CN | 106427293 A | 2/2017 |
| CN | 107097562 A | 8/2017 |
| DE | 2255495 B | 5/1974 |
| EP | 0137171 A2 | 4/1985 |
| JP | 2000177117 A | 6/2000 |
| JP | 2004042263 A | 2/2004 |
| KR | 1020010008930 A | 2/2001 |
| KR | 1020170112854 A | 10/2017 |
| WO | 2011160979 A2 | 12/2011 |

OTHER PUBLICATIONS

European Patent Office, Written Opinion of the International Searching Authority for International Application No. PCT/EP2019/052771, dated Apr. 24, 2019.

* cited by examiner

DEVICE FOR MANUAL APPLICATION OF A LIQUID

The invention concerns a device for manual application of a liquid, particularly for painting, marking, drawing, writing and/or applying make-up to keratinous surfaces, in which the device has a capillary store for the liquid.

In other words, the invention concerns a pen or a marker in particular. Devices of this kind are known. If the capillary store is empty, the device stops functioning without advance warning. This is particularly annoying if there is no replacement device available and no possibility of refilling during use.

The invention is based on the task of removing the above disadvantage and giving a user the possibility of preparing for the liquid store running out soon in good time.

According to the invention the task set is carried out with a device of the type indicated at the beginning by a device for measuring the filling level of the capillary store. Through such filling level measurement a user of the device may prepare for the liquid store running out early on and ensure replacement or refilling in good time.

According to the invention preferably the filling level measurement device has a moisture sensor. Such a moisture sensor in particular is very suitable for measuring the filling level of a liquid store that is made as a capillary store.

According to the invention also preferably the moisture sensor has conducting paths, which are designed and arranged in such a way that they measure the filling level of the capillary store resistively or capacitively. In other words, the invention uses the fact that the total resistance and capacity between both types of conducting path circuit changes depending on the filling level of the capillary store. That is to say this circuit contains a current circuit, to which a section between conducting paths that is formed by the capillary store belongs, in which the resistance and capacity of the section indicated change depending on the filling level. One part of the conducting paths may be connected to the positive terminal and the other to the negative terminal of a voltage source in this.

In principle the conducting paths may be made in any way in this. It has proved advantageous to give the conducting paths a comb-like structure.

According to a particularly preferred embodiment of the invention the device has an interface (such as an antenna), which is designed to provide the result of the filling level measurement in a contact-fee way. Through this it is not necessary for there to be display equipment for the filling level on the device itself. Rather the result of the filling level measurement may be provided by means of a smart phone or other device, which may receive data in a contact- free or wireless way.

According to the invention also preferably an electronic circuit is provided, which is connected to an antenna that is serving as the interface and the filling level measurement device. In this in principle the electronic circuit serves to provide the measurement result via the antenna in an appropriate form.

According to the invention also preferably in this the antenna serves not only to provide the measurement result, but also rather to supply the electronic circuit with power. In other words, according to the invention preferably the device works according to the RFID (Radio Frequency Identification) or transponder (Transmitter and Responder) principle.

If the filling level is read according to the RFID principle, then for reliable data transfer in many cases it is advantageous if the antenna of the device lies parallel to the antenna of the reading unit, in which the reading unit may be a mobile phone for example. Therefore, should the device have the form of a flat marker, the corresponding standards result. Therefore according to the invention it is preferable that the antenna lies parallel to the outer surface, particularly if the device has a flat outer surface extending in the longitudinal direction of the device.

Additionally or alternatively, according to the invention at least two antennas may be provided, which lie in planes that are perpendicular to each other. In this way it is particularly simple to achieve the necessary antenna gain irrespective of mutual alignment.

According to a further preferred embodiment of the invention a capacitor and a rectifier are provided for supplying the electronic circuit with power, Through this there is the possibility of obtaining the power necessary for operating the electronic circuit inductively using the antenna, in which the capacitor serves as a buffer.

According to a particularly preferred embodiment of the invention it is provided that the filling level measurement device and/or the interface lie on a carrier, particularly on a carrier made of flexible plastic. This results in advantages of both a mechanical kind with regard to stability as well as with regard to manufacture. That is to say no changes in the production process are necessary for the device according to the invention in comparison with previous devices. If in the production process for the capillary store the carrier with the filling level measurement device lying on it and/or the interface also lying on it are supplied with the fibres for the capillary store, the integration of the filling level measurement device or the interface into the production process is particularly simple and trouble-free.

According to the invention also preferably the filling level measurement device and/or the interface are arranged in the capillary store. This serves particularly for freedom in the design of the outside appearance of the device.

Finally according to the invention preferably it is provided that the capillary store has a longitudinal centre line and in the cross-sectional view the filling level measurement device and/or the interface has/have a distance of at least 5% of the maximum transverse extension of the capillary store from the longitudinal axis and/or the outer limit of the capillary store.

The above minimum distance from the longitudinal axis serves to arrange the filling level measurement device or the interface outside the area where a tip of the applicator device lies or may come to lie later for example. The minimum distance from the outer limit of the capillary store serves to protect the filling level measurement device and/or the interface and if necessary the carrier from excessive heating, if the elements indicated are already embedded in the capillary store during extrusion, when forming a covering for the capillary store by extrusion for example.

The invention is explained in more detail in the following using a preferred example embodiment with reference to the enclosed drawing with further details. They show FIG. 1 a diagrammatic, perspective view of an example embodiment of the applicator device according to the invention in the form of a flat marker, FIG. 2 the marker from FIG. 1, but without its front part, FIG. 3 a diagrammatic view of an example embodiment of the filling level measurement device according to the invention, including electronic circuit and antenna, FIG. 4 diagrammatically the arrangement of the elements in a capillary store shown in FIG. 3 and FIG. 5 the same view as FIG. 4, but from another embodiment.

Figure 3:
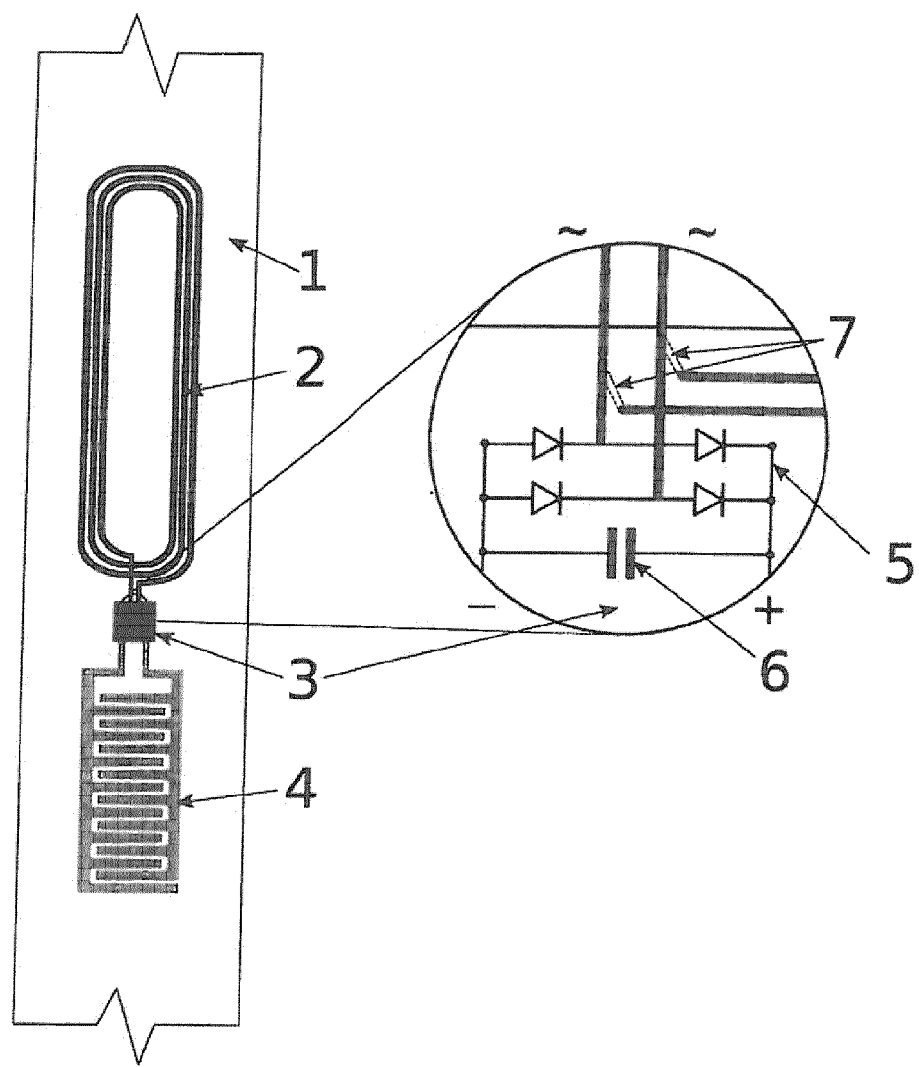
Figure 4:
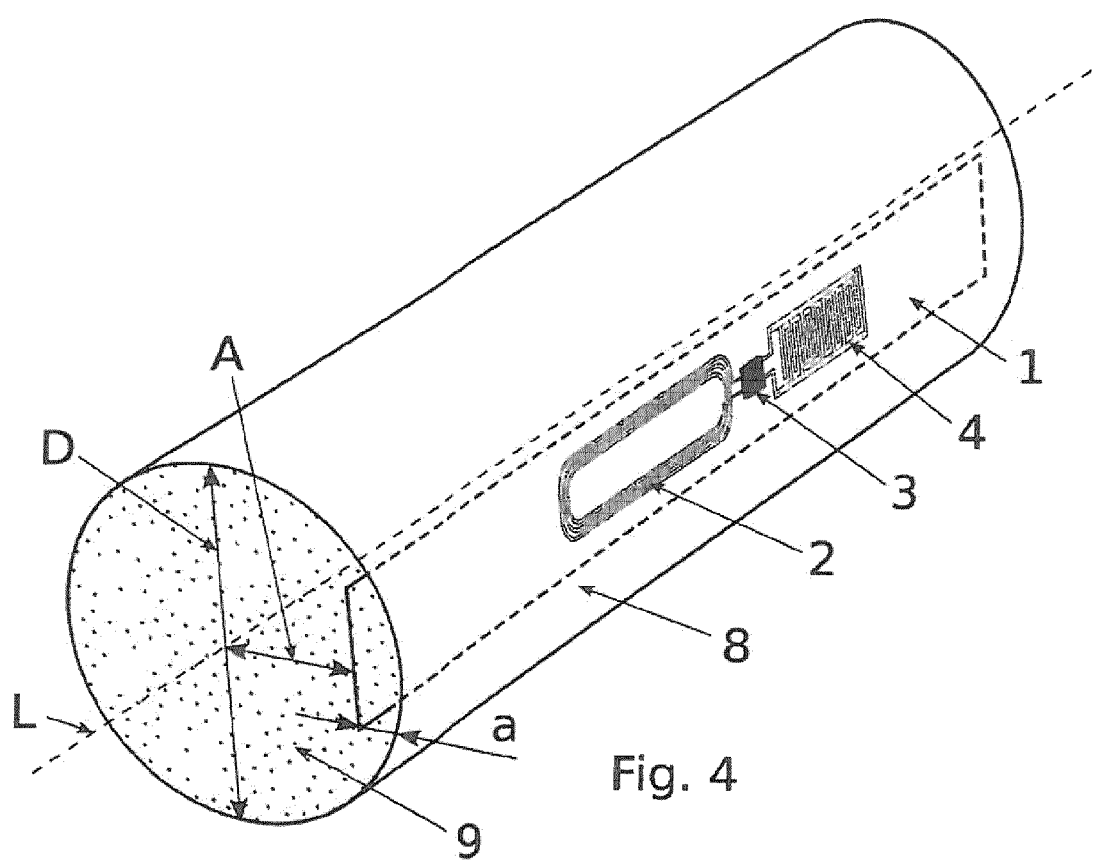
Figure 5:
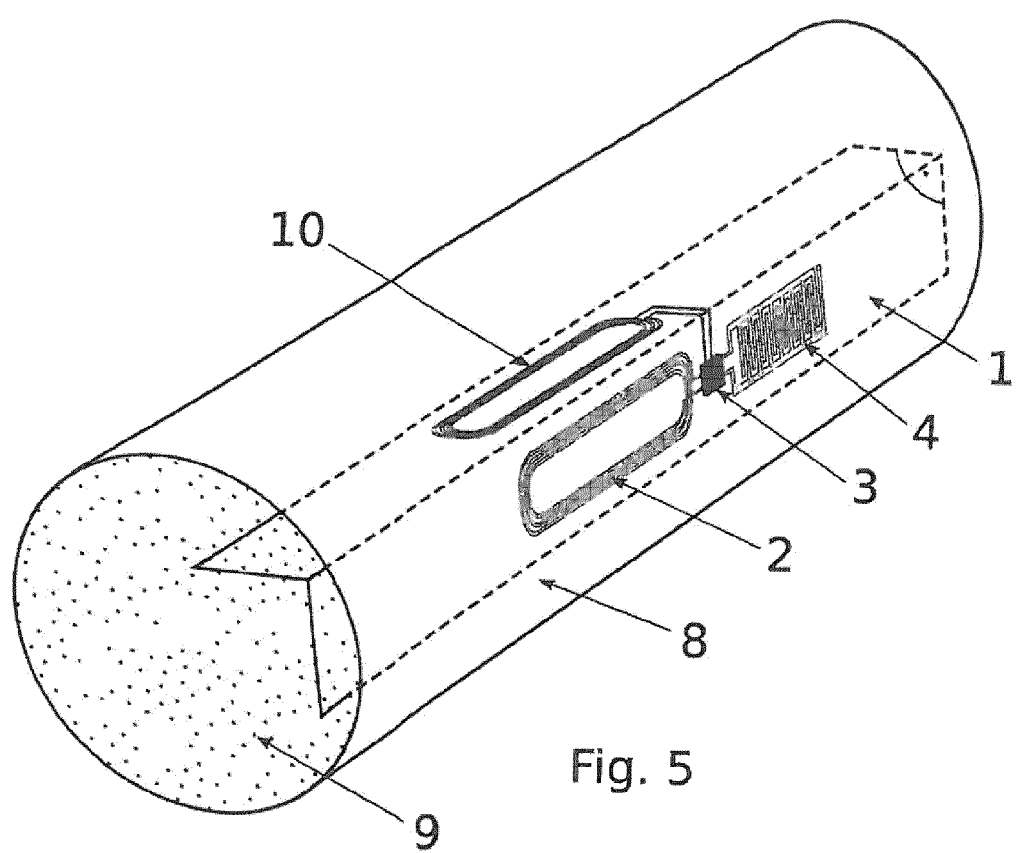

FIGS. 3 to 5 show a carrier strip 1, an antenna 2, an electronic circuit 3, conducting paths 4, a fibre store that is indicated with the reference number 8 as a whole and a filling 9 of the fibre store 8.

In preferred embodiments, such as those exemplified in the figures, the filing level measurement device comprises an electronic circuit 3. In such embodiments, the electronic circuit 3 represents the heart of the system. This is an MD chip with an integrated A/I) converter, which is applied to the carrier strip 1, which is made flexibly in this example embodiment. The electronic circuit 3 is connected to the antenna 2 on the one hand, through which it is supplied with power by means of an electromagnetic alternating field. It is also connected to the conducting paths 4, The conducting paths 4 have two comb-like parts, by means of which the amount of liquid in the fibre store 8 may be measured resistively. This unit is indicated as a circuit in the following. Depending on the degree of wetting of the intermediate area between the conducting paths 4 with the liquid contained in the fibre store 8, the electrical resistance between both combs of the conducting paths 4 and therefore the resistance in the circuit goes down with increasing filling level in the fibre store 8.

In order to make an enquiry regarding the filling level, an evaluation device must be used, in which in the example embodiment illustrated this may be a mobile phone, on which a suitable App is installed. The mobile phone must be capable of nearfield communication (NFC) for this purpose. NFC supplies the antenna of the mobile phone with an electrical alternating current, which induces a current in surrounding conductive objects via a magnetic field. If the fibre store 8 with the elements described above arranged in it is brought near the telephone, an alternating current is induced in the antenna 2. Through a rectifier 5 provided in the electronic circuit 3 a capacitor 6 also provided in the electronic-circuit 3 is charged, which supplies the RFID chip with the necessary power. The chip now measures the ohmic resistance in the circuit indicated above and sends the measurement result to the mobile phone via the antenna 2. The result may be displayed there. The electronic circuit 3 together with the conducting paths 4 represents a moisture sensor. The antenna 2 serves as an interface for providing the result of the filling level measurement in a contact-free way.

A rectifier 5, a capacitor 6 and a switch 7 belong to the electronic circuit 3. In the position shown in FIG. 3 the switch 7 connects the antenna 2 to the rectifier 5. In this situation the capacitor 6 may be charged inductively via the antenna 2. If the capacitor 6 is full, the switch 7 connects the antenna 2 to the antenna output of the electronic circuit 3, therefore it is ensured that the radio signal is not lost in the rectifier 5.

The production of an example embodiment of the device according to the invention is explained in the following. The electronic circuit 3, the conducting paths 4 and the antenna 2 are applied to a continuous strip made of a flexible plastic. The production steps necessary for this are generally known. Advantageously in this the division between two units corresponds precisely to the length of a fibre store of the devices to be produced. Precise insertion of the elements indicated into the fibre store 8 is possible through this.

The fibre store 8 has a strand of threads (made of polyester for example) as filling 9, which is pulled through the centre of a ring nozzle. This ring nozzle extrudes a tube made of covering material (polypropylene for example) around the fibre strand. This continuous strand provided with the covering is shortened to the desired length by a rotating knife after the covering material has cooled.

Before the ring nozzle the continuous strip with the circuit elements on it is added to the strand, so that it is embedded in the strand. The continuous strand provided with the covering is always cut between two circuit units. This may be done by optical or inductive measurement of the position of the circuits on the continuous strip when they are supplied for example, which synchronises cutting, Such a store fitted with circuit elements may be used like a normal fibre store in a shaft or suchlike.

The circuit elements are not added at the edge of the strand as far as possible in this. If they are completely surrounded by fibres, they also become less heated in the extrusion process, which makes the use of cheaper, less heat-resistant plastics such as polyester possible for the carrier strip 1. However, the carrier strip 1 also should not lie precisely in the middle of the fibre store 8. Because the actual applicator element (therefore the tip of a pen for example) is inserted there when the device is assembled.

In FIG. 4 the longitudinal axis of the fibre store 8 is indicated with L. The distance A of the carrier strip 1 and therefore the antenna 2 as well as the electronic circuit 3 and the conducting paths 4 from the longitudinal axis L should be more than 5% of the diameter D. In the example embodiment shown it is 44%. The distance a from the outer edge is 11% of the diameter D in the example embodiment shown.

Therefore, compared with conventional devices of the type indicated at the beginning, in principle the production process does not have to be changed. Only the carrier with the circuit elements on it has to be inserted into the fibre bundle before extrusion.

Figure 2:
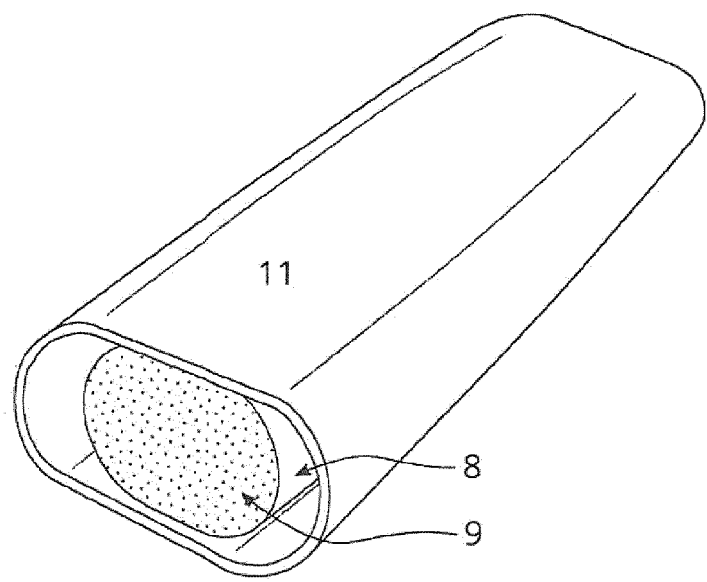

If the fibre store 8 with the filling level measurement device provided with only one antenna 2 is used in the flat marker according to FIGS. 1 and 2, it must be inserted in such a way that the antenna 2 lies with its main plane parallel to the flat surfaces 11 of the marker. Additional expense is necessary in order to ensure this.

This expense is not necessary in the example embodiment according to FIG. 5. According to FIG. 5 a second antenna 10 is connected orthogonally to the first antenna 2. Electrically both antenna 2, 10 lie parallel to the electronic circuit 3. In this form a sufficient amount of power is transferred by inductive coupling and any radio signal transferred is received with sufficient strength on an evaluation device with the antenna 2 and 10 in any position with reference to the evaluation device (mobile phone for example).

The characteristics of the invention disclosed in the above description, the claims and the drawing may be essential for carrying out the invention in its various embodiments both individually and also in any combination.

The invention claimed is:

1. A device for manual application of a liquid, comprising:
    a capillary store for the liquid, the capillary store having a filling level,
    a measuring device for measuring the filling level of the capillary store, the measuring device including an electronic circuit. and
    an antenna connected to the electronic circuit and configured to contactlessly provide a result of the filling level measurement.

2. The device according to claim 1, wherein the measuring device further comprises a moisture sensor.

3. The device according to claim 2, wherein the moisture sensor comprises conducting paths configured and arranged to measure the filling level of the capillary store resistively or capacitively.

4. The device according to claim 3, wherein the conducting paths comprise a comb-like structure.

5. The device according to claim 4, wherein the comb-like structure comprises two intertwined comb-like components.

6. The device according to claim 5, wherein the electrical resistance between the combs of the conducting paths decreases with increasing filing level in the capillary store.

7. The device according to claim 1, wherein the antenna is configured to supply the electronic circuit with power.

8. The device according to claim 1, wherein the device comprises a flat outer surface extending in a longitudinal direction of the device and the antenna is disposed parallel to the outer surface.

9. The device according claim 1, wherein the antenna comprises at least two antenna disposed in planes that are perpendicular to each other.

10. The device according claim 9, wherein the two antennas both lie parallel to the electronic circuit.

11. The device according to claim 1, further comprising a capacitor and a rectifier for supplying the electronic circuit with power.

12. The device according to claim 1, wherein the rneasurin,g device the antenna, or the measuring device and the antenna are disposed on a carrier.

13. The device according to claim 12, wherein the carrier is constructed of a flexible plastic.

14. The device according to claim 1, wherein the measuring device, the antenna, or the measuring device and the antenna are arranged in the capillary store.

15. The device according to claim 14, wherein the capillary store comprises a longitudinal center line and in the cross-sectional view, the measuring device the antenna or the measuring device and the antenna have a distance of at least 5% of a maximum transverse extension of the capillary store from a longitudinal axis, an outer limit of the capillary store, or the longitudinal axis and the outer limit of the capillary store.

16. The device according to claim 15, wherein the measuring device, the antenna, or the measuring device and the antenna are positioned off-center from the longitudinal center line of the capillary store.

17. The device according to claim 1, wherein the capillarystore contains fibers.

18. The device according to claim 17, wherein the fibers comprise polyester strands.

19. The device according to claim 1, wherein the antenna sends the filling level measurement to a software application.

20. The device according to claim 19, wherein the software application is installed on a mobile phone.

* * * * *